UNITED STATES PATENT OFFICE.

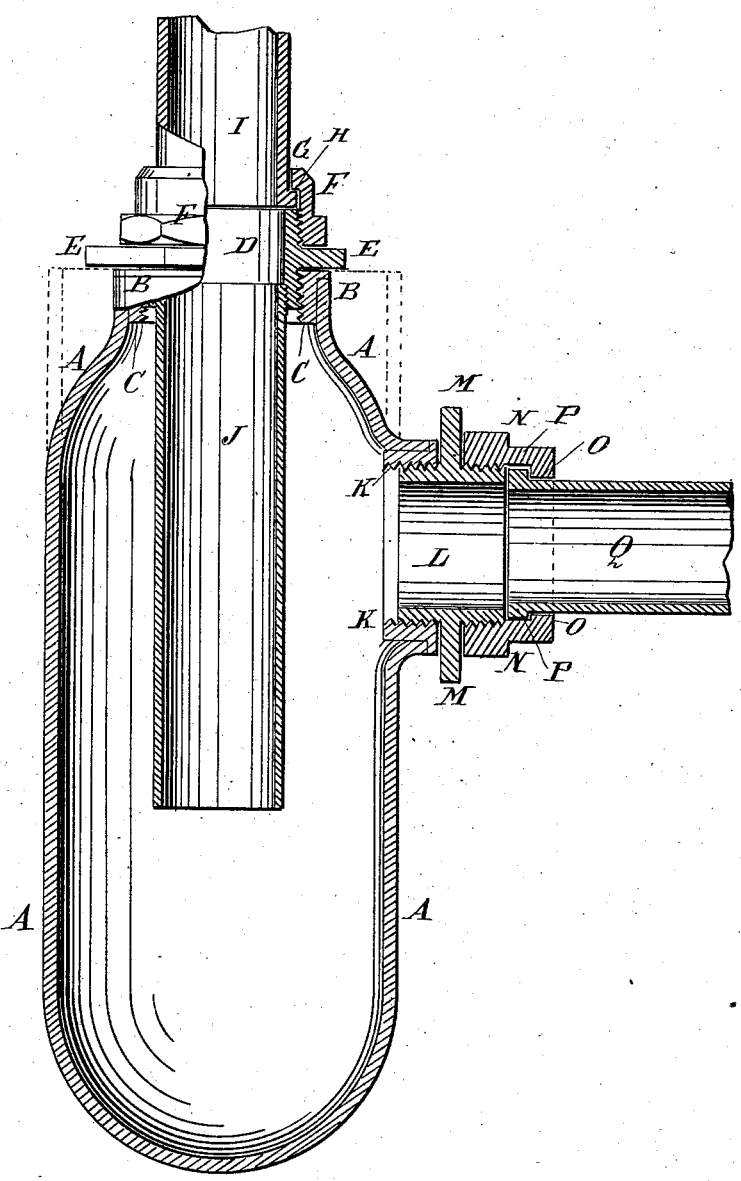

GEORGE M. McCLOSKEY, OF BROOKLYN, NEW YORK.

REMOVABLE BOTTLE-TRAP.

SPECIFICATION forming part of Letters Patent No. 294,489, dated March 4, 1884.

Application filed May 12, 1883. (No model.)

*To all whom it may concern:*

Be it known that I, GEORGE M. MCCLOSKEY, of Brooklyn, in the county of Kings and State of New York, have invented certain new and useful Improvements in Removable Bottle-Traps, of which the following is a full, clear, and exact description.

Reference is to be had to the accompanying drawing, forming a part of this specification, and which is a sectional side elevation of my improvement.

The object of this invention is to facilitate the cleaning of bottle-traps, and also to promote convenience in attaching the said traps to their pipes and removing them therefrom.

The invention consists in a removable bottle-trap constructed with a body of cylindrical cup form having its shell cast around a female screw to form a discharge-opening in its side, and having its mouth spun into a neck and provided with a female screw.

Into the female screws are screwed tubular screws having central flanges, and having at their outer ends screw-clamping rings, so that the said trap can be readily secured to and removed from the inlet and outlet pipes, as will be hereinafter fully described.

A represents the body of the trap, which is cast in the shape of a cylindrical cup, as indicated by the dotted lines in the figure. The open upper end of the trap A is then spun into proper shape to form a neck, B, to receive and fit upon the female-screw tube C, which is then soldered in place, and into which is screwed the inner part of the tubular male screw D until the flange E, formed around its central part, rests against the outer ends of the female-screw tube C.

Upon the outer part of the tubular screw D is screwed the coupling-ring F, which has an inwardly-projecting flange, G, at its outer end. The flange G rests upon the outwardly-projecting flange, H, formed around the inner end of the inlet-pipe I, the inner end of which rests against the outer end of the tubular screw D, so that the said pipe I will be securely connected with the trap A.

Into the inner end of the tubular screw D is screwed the outer end of the pipe J, which forms a continuation of the inlet-pipe I, and extends nearly to the bottom of the trap A.

In the upper part of the side of the trap A is cast an opening, the neck of which is cast upon a female screw, K.

Into the screw K is screwed the inner end of a tubular screw, L, until the flange M, formed around the middle part of the said screw L, rests against the outer end of the said screw K.

Upon the outer end of the screw L is screwed the coupling-ring N, upon the outer end of which is formed an inwardly-projecting flange, O, to interlock with the flange P, formed around the inner end of the outlet-pipe Q, so as to firmly connect the said pipe with the trap A.

With this construction, by unscrewing the coupling-rings F N, the trap will be disconnected from the inlet-pipe I and the outlet-pipe Q, so that it can be readily cleaned and conveniently replaced.

With this construction, the trap A can be cast in one piece, instead of being cast in two pieces, and then soldering or otherwise connecting the said parts, as has heretofore been necessary.

Having thus described my invention, what I claim as new, and desire to secure by Letters Patent, is—

In a removable bottle-trap, the combination, with the cylindric cup having its mouth spun into a neck which is provided with a female-screw tube, of the tubular male screw having an external circumferential flange, and coupling-ring to receive the inlet-pipe, substantially as and for the purpose set forth.

GEORGE M. McCLOSKEY.

Witnesses:
JAMES L. CAMPBELL,
WILLIAM C. TURNER.